(12) United States Patent
Choi et al.

(10) Patent No.: US 11,437,616 B2
(45) Date of Patent: Sep. 6, 2022

(54) NANOWIRE FOR ANODE MATERIAL OF LITHIUM ION CELL AND METHOD OF PREPARING THE SAME

(71) Applicants: INSTITUTE FOR BASIC SCIENCE, Daejeon (KR); POSTECH ACADEMY-INDUSTRY FOUNDATION, Gyeongsangbuk-do (KR)

(72) Inventors: Hee Cheul Choi, Gyeongsangbuk-do (KR); Hyungki Kim, Gyeongsangbuk-do (KR)

(73) Assignees: INSTITUTE FOR BASIC SCIENCE, Daejeon (KR); POSTECH ACADEMY-INDUSTRY FOUNDATION, Gyeongsangbuk-do (KR)

(*) Notice: Subject to any disclaimer, the term of this patent is extended or adjusted under 35 U.S.C. 154(b) by 343 days.

(21) Appl. No.: 16/352,334

(22) Filed: Mar. 13, 2019

(65) Prior Publication Data
US 2019/0214644 A1    Jul. 11, 2019

Related U.S. Application Data

(62) Division of application No. 15/091,254, filed on Apr. 5, 2016.

(30) Foreign Application Priority Data

Jul. 29, 2015    (KR) .......................... 10-2015-0107138

(51) Int. Cl.
*H01M 4/38*    (2006.01)
*C22C 28/00*    (2006.01)
(Continued)

(52) U.S. Cl.
CPC ............. *H01M 4/386* (2013.01); *C22C 28/00* (2013.01); *C22F 1/16* (2013.01); *H01M 4/38* (2013.01);
(Continued)

(58) Field of Classification Search
CPC ...... C22C 28/00; C22F 1/16; H01M 10/0525; H01M 4/134; H01M 4/38; H01M 4/386
See application file for complete search history.

(56) References Cited

U.S. PATENT DOCUMENTS 7,301,199 B2    11/2007    Lieber
7,858,965 B2    12/2010    Lu
(Continued)

FOREIGN PATENT DOCUMENTS

KR    1020110111105 A    10/2011

OTHER PUBLICATIONS

Musin, R. et al. "Structural and electronic properties of epitaxial core-shell nanowire heterostructures." 2005. Physical Review B 71. p. 1-4 (Year: 2005).*

(Continued)

*Primary Examiner* — Nicholas A Wang
(74) *Attorney, Agent, or Firm* — George S. Blasiak; Heslin Rothenberg Farley & Mesiti P.C.

(57) ABSTRACT

The disclosure describes a nanowire for an anode material of a lithium ion cell and a method of preparing the same. The nanowire includes silicon (Si) and germanium (Ge). The nanowire has a content of the silicon (Si) higher than a content of the germanium (Ge) at a surface thereof, and has the content of germanium (Ge) higher than the content of the silicon (Si) at an inner part thereof.

3 Claims, 25 Drawing Sheets

(51) Int. Cl.
C22F 1/16 (2006.01)
H01M 10/0525 (2010.01)
H01M 4/134 (2010.01)

(52) U.S. Cl.
CPC ........ *H01M 4/134* (2013.01); *H01M 10/0525* (2013.01)

(56) References Cited

U.S. PATENT DOCUMENTS

| | | | |
|---|---|---|---|
| 8,653,599 B1* | 2/2014 | Cheng | H01L 21/845 257/351 |
| 2008/0014689 A1* | 1/2008 | Cleavelin | B82Y 10/00 438/197 |
| 2009/0297849 A1* | 12/2009 | Carella | C01B 33/02 428/388 |
| 2011/0133167 A1* | 6/2011 | Bangsaruntip | B82Y 10/00 257/24 |
| 2014/0141318 A1 | 5/2014 | Lee et al. | |
| 2017/0033356 A1 | 2/2017 | Choi et al. | |

OTHER PUBLICATIONS

Liu, X. et al. "The composition-dependent mechanical properties of Ge-Si core-shell nanowires." 2008. Physica E 40. p. 3042-3048. (Year: 2008).*

Lauhon, L. et al. "Epitaxial core-shell and core-multishell nanowire heterostructures." 2002. Nature. 420. p. 57-61. (Year: 2002).*

S.T. Picraux, S.A. Dayeh, P. Manandhar, D.E. Perea, and S.G. Choi; Silicon and Germanium Nanowires: Growth, Properties and Integration; Apr. 17, 2010, vol. 62, No. 4, 35-43.

Germanium Silicon Alloy Anode Material Capable of Tunable Overpotential by Nanoscale Si Segregation; ACS Publications; Published in Nano Letters, May 11, 2015, 15(6), p. 4135-4142.

Office action in related Japanese Patent Application case No. 2015-220786, dated Nov. 15, 2016. (submitted with original office action and full text translation).

J. Nah, et al., "Doping of GE-$Si_xGe_{1-x}$ Core-Shell Nanowires Using Low Energy Ion Implantation," *Applied Physics Letters*, 93,203108, published Nov. 20, 2008.

Liu, X.W. et al. "The Composition-Dependent Mechanical Properties of Ge-Si Core-Shell Nanowires," Physics E. 40. p. 3042-3048, 2008.

Musin et al. "Structural and Electronic Properties of Epitaxial Core-Shell Nanowire Heterostructures," Physical Review B 71, pp. 1-4, 2005.

Kennedy et al. "Nanowire Heterostructures Comprising Germanium Stems and Silicon Branches a High-Capacity Li-Ion Anodes with Tunable Rate Capability," ACS Nano (9) 7, pp. 7456-7465, 2015.

Restriction Requirement for U.S. Appl. No. 15/091,254, filed Apr. 5, 2016, dated Feb. 26, 2018.

Applicant's Response to Restriction Requirement for U.S. Appl. No. 15/091,254, filed Apr. 5, 2016, dated Apr. 26, 2018.

Non-Final Office Action for U.S. Appl. No. 15/091,254, filed Apr. 5, 2016, dated Jun. 15, 2018.

Applicant's Response to Non-Final Office Action for U.S. Appl. No. 15/091,254, filed Apr. 5, 2016, dated Sep. 17, 2018.

Final Office Action for U.S. Appl. No. 15/091,254, filed Apr. 5, 2016, dated Dec. 13, 2018.

Applicant's Response to Final Office Action for U.S. Appl. No. 15/091,254, filed Apr. 5, 2016, dated Feb. 13, 2019.

Advisory Action for U.S. Appl. No. 15/091,254, filed Apr. 5, 2016, dated Feb. 28, 2019.

* cited by examiner

[Fig. 1]
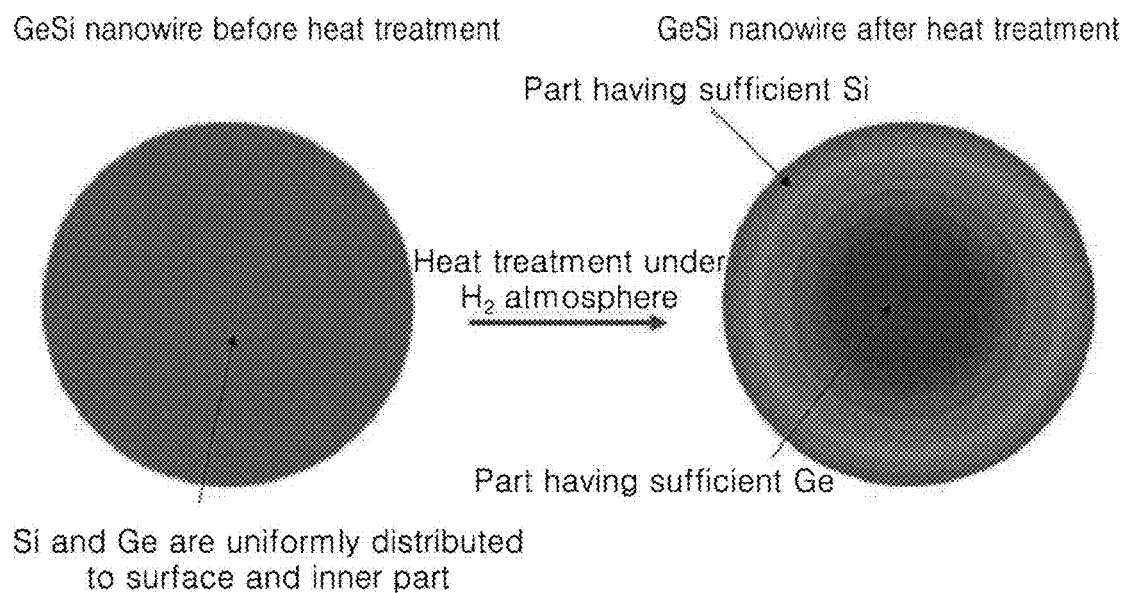

[Fig. 2]
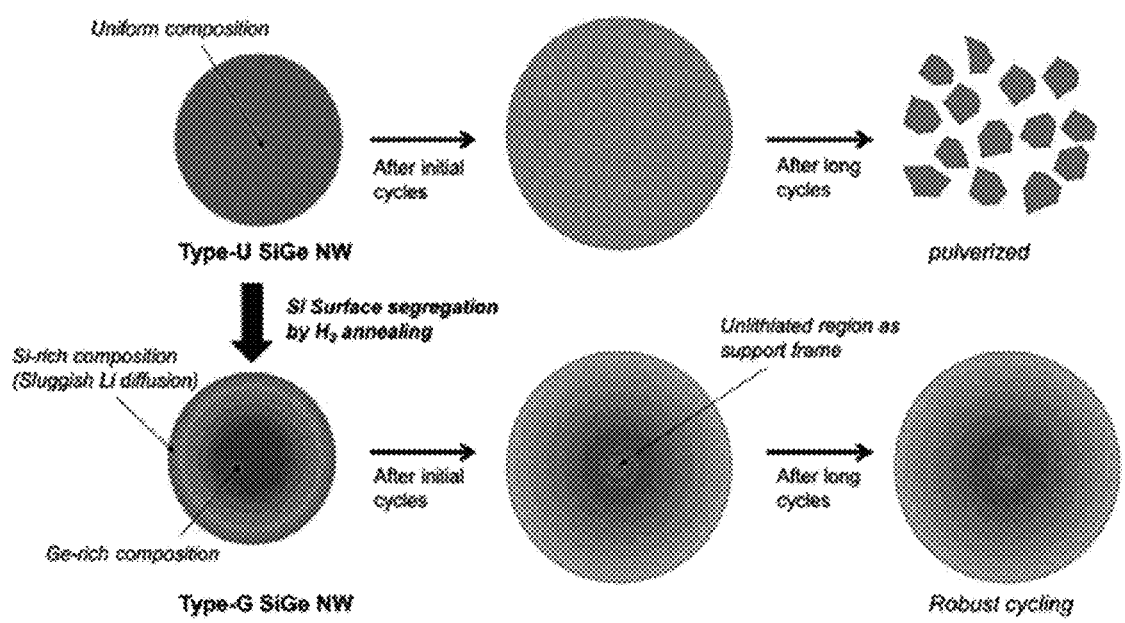

[Fig. 3a]
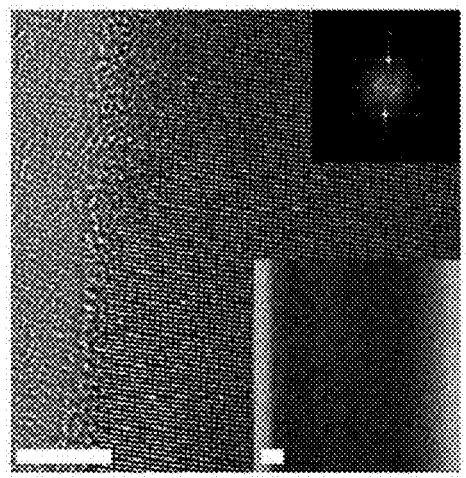

[Fig. 3b]
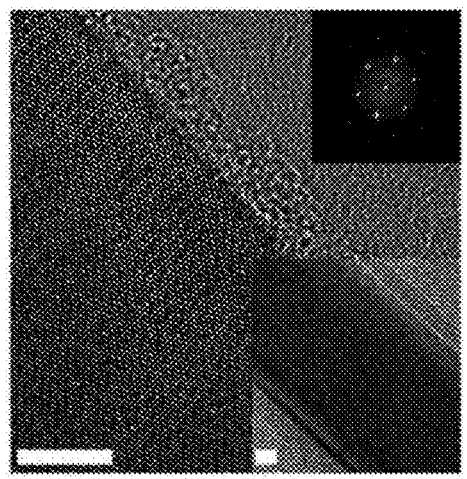

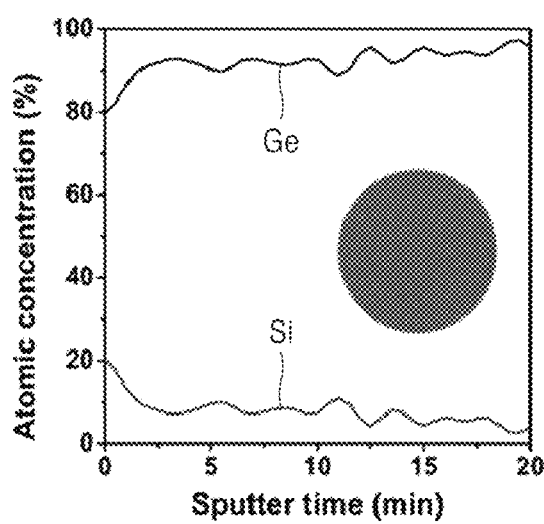
[Fig. 3c]

[Fig. 3d]
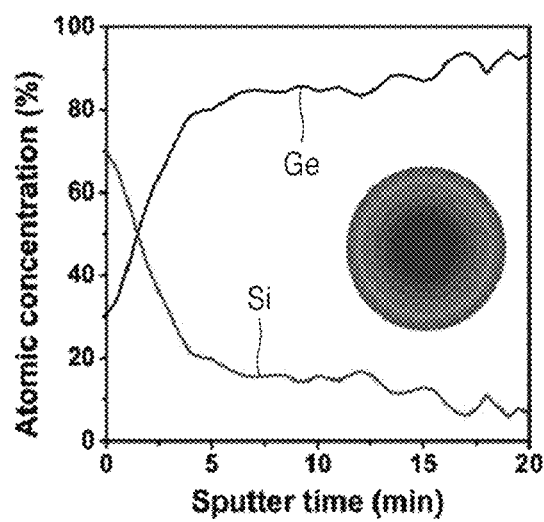

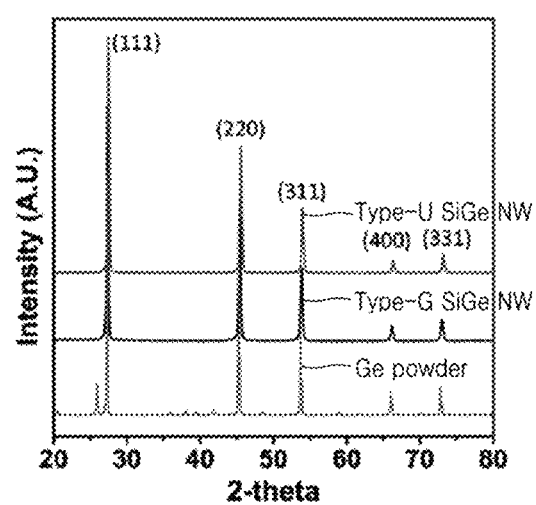
[Fig. 4a]

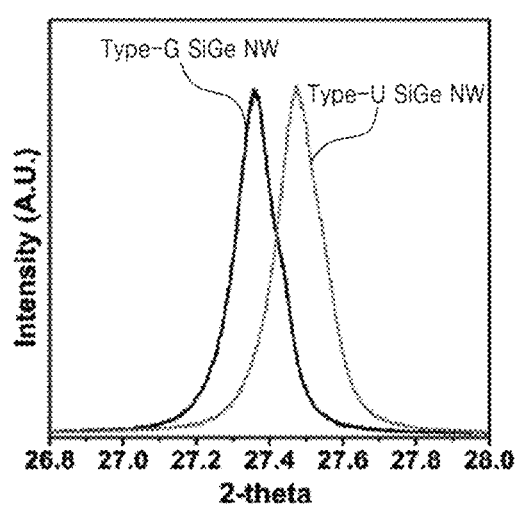
[Fig. 4b]

[Fig. 4c]
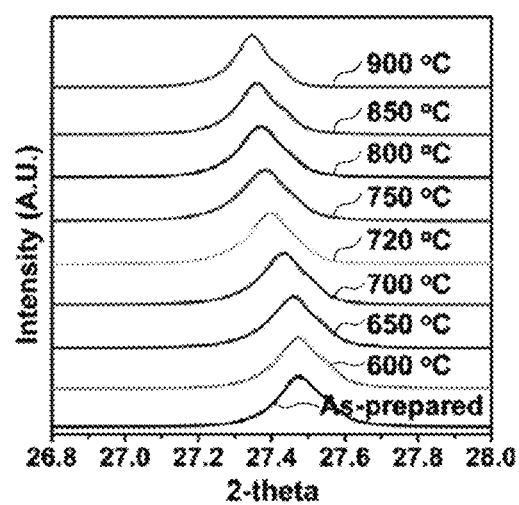

[Fig. 4d]
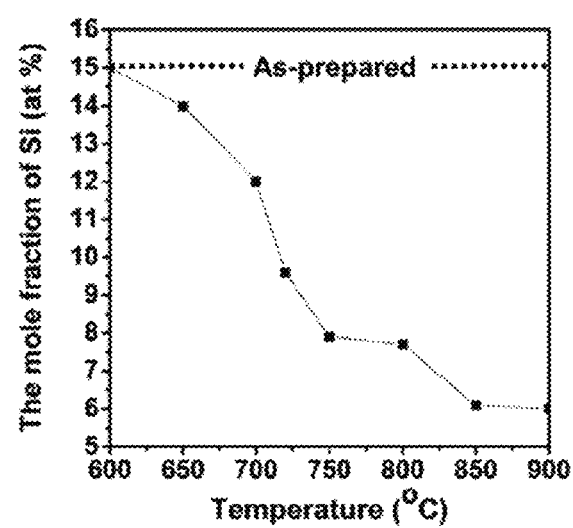

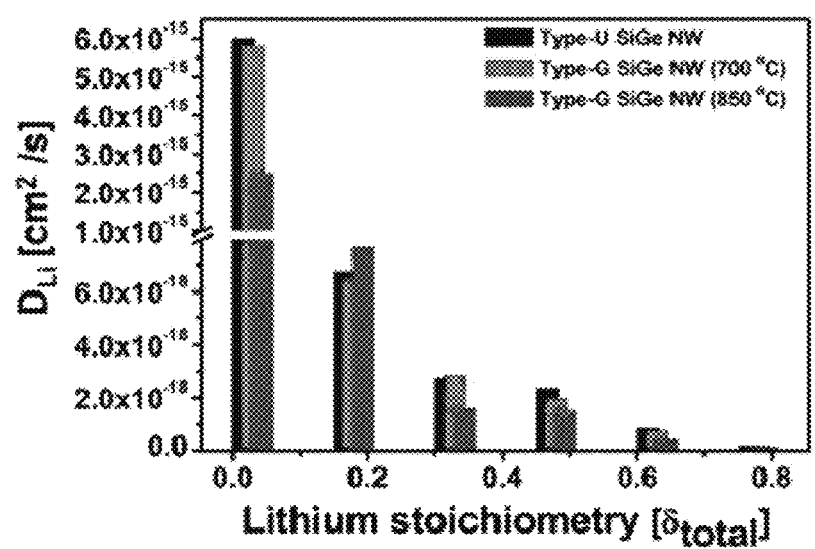

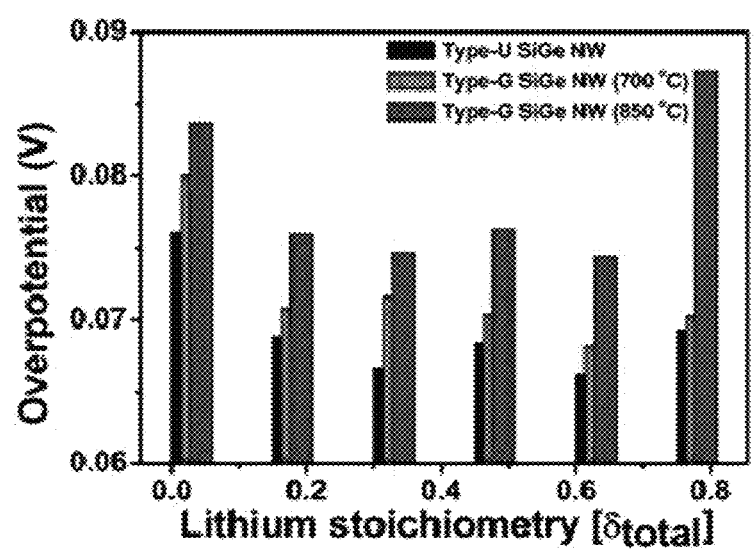
[Fig. 5b]

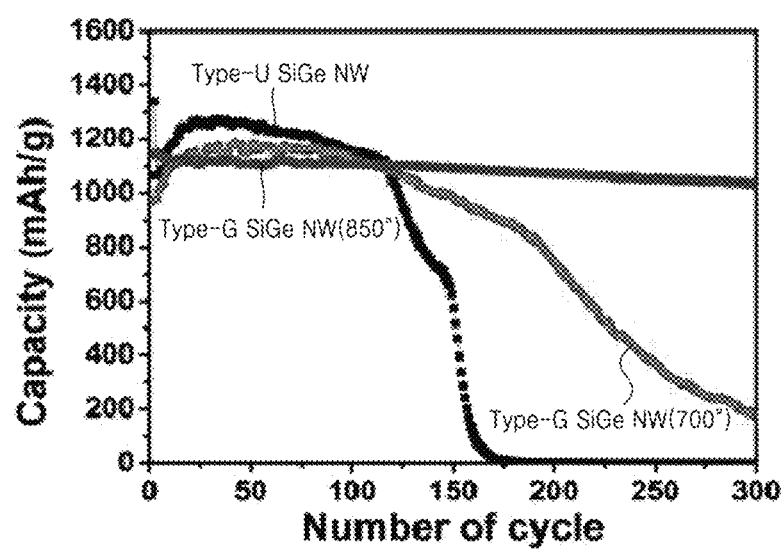
[Fig. 5c]

[Fig. 6a]
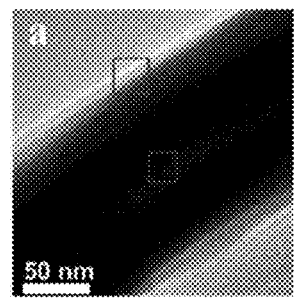

[Fig. 6b]
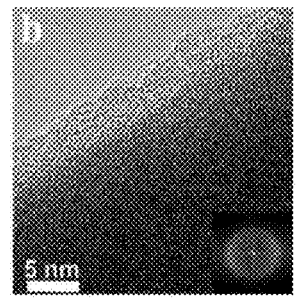

[Fig. 6c]
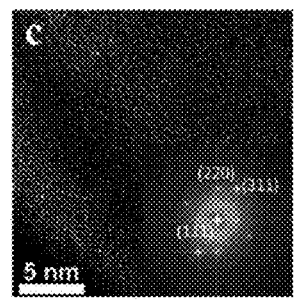

[Fig. 6d]
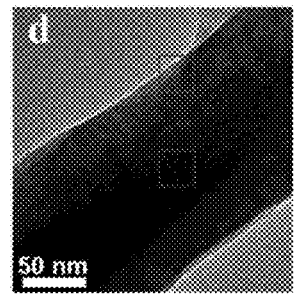

[Fig. 6e]
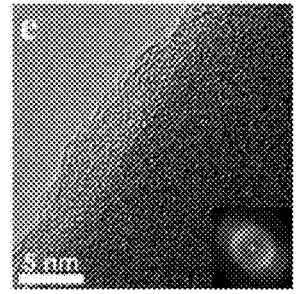

[Fig. 6f]
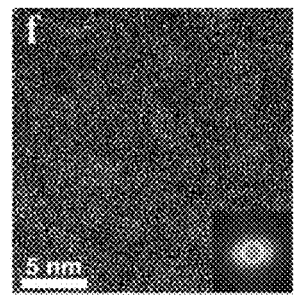

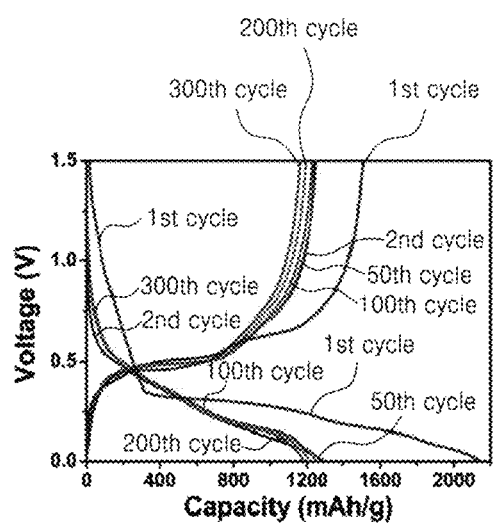
[Fig. 7a]

[Fig. 7b]
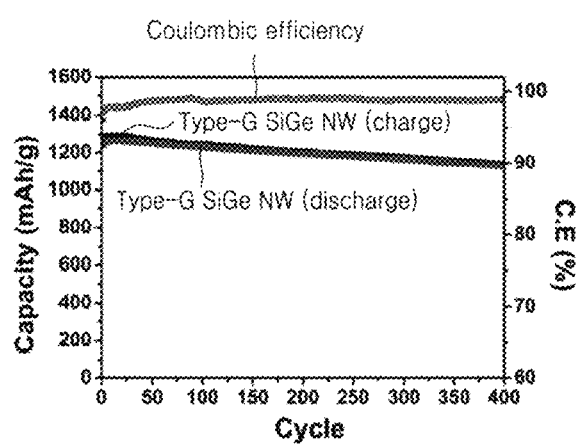

[Fig. 7c]
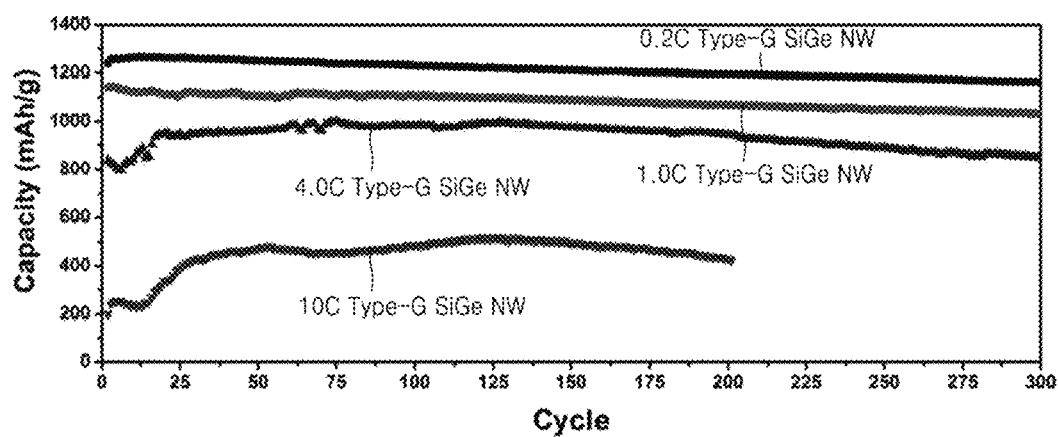

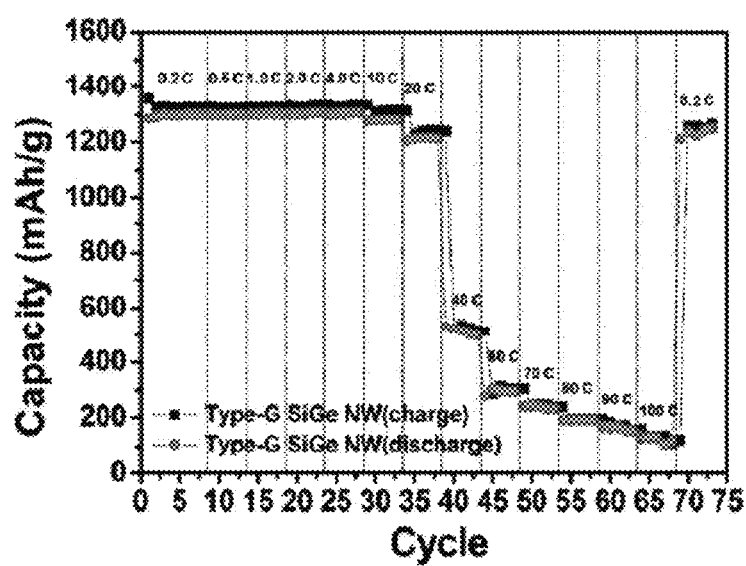
[Fig. 8]

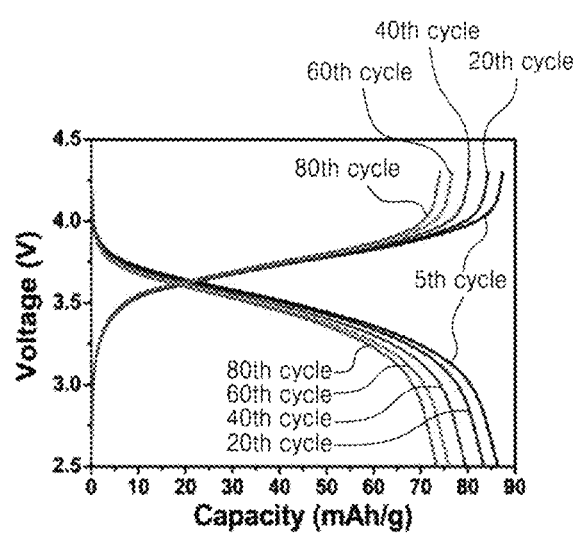
[Fig. 9a]

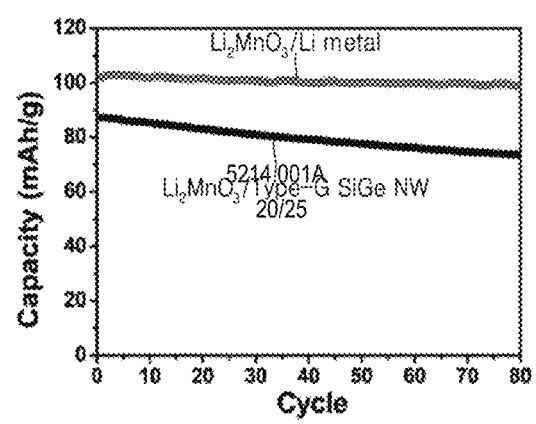
[Fig. 9b]

NANOWIRE FOR ANODE MATERIAL OF LITHIUM ION CELL AND METHOD OF PREPARING THE SAME

CROSS-REFERENCE TO RELATED APPLICATION

This application is a divisional of U.S. application Ser. No. 15/091,254 filed Apr. 5, 2016, the contents of which is incorporated by reference in its entirety, which U.S. application Ser. No. 15/091,254 filed Apr. 5, 2016 claims priority to Korean Patent Application No. 10-2015-0107138 filed on Jul. 29, 2015, and all the benefits accruing therefrom under 35 U.S.C. § 119, the contents of which is incorporated by reference in its entirety.

BACKGROUND OF THE INVENTION

1. Field of the Invention

The present invention relates to a nanowire for an anode material of a lithium ion cell and a method of preparing the same.

2. Description of the Related Art

Group IV elements, such as Si, Ge, and Sn, are anode materials capable of obtaining significantly higher energy density as compared as that of a graphite anode commercialized as an anode of a conventional lithium ion cell. However, in spite of the high theoretical capacity of the elements, the excessive volume expansion resulting from the lithiation/delithiation process causes the anode material to be destroyed, so that the anode material may not be commercialized.

The above problems may be overcome by forming a complex nano-structure to maintain the morphology of an anode active material every cycle. As one example, in order to prevent the volume expansion, a nano-complex structure of Si or Ge and a material having a buffer function is formed. To this end, studies and researches have been performed on a carbon-based material, such as amorphous carbon or a reduced graphene oxide, which is generally known as having superior mechanical and electrical properties. Actually, the performance of a battery can be significantly improved. However, according to the approach way, a large amount of carbon (10 wt % to 39.5 wt % of carbon) must be contained in an electrode in order to ensure the stable lifespan characteristic and a charging/discharging capacity may be degraded. As another example, an internal empty space is formed and thus the volume expansion can be effectively reduced by the internal empty space. Numerous nanostructures, such as nano-tubes, porous nanowires/nano-particles, and a mesoporous sponge nano-structure, have been studied for a stable lifespan characteristic. As the morphology of the complex nano-structure is maintained, the performance of the lithium ion cell can be significantly improved. In order to obtain the complex nano-structure, a complex synthesizing process is required, thereby causing the yield rate being lowered, and forming many internal empty spaces, so that the volume capacity may be lowered. Accordingly, the development of the anode active material for the nanostructure having no empty space and for representing a high charging capacity is required.

As a prior art, there is Korean Patent Unexamined Publication No. 10-2011-0111105 (published on Oct. 10, 2011) entitled "Silicon nanowire comprising high density metal nanoclusters and process of preparing the same".

SUMMARY OF THE INVENTION

An object of the present invention is to provide a nanowire for an anode material of a lithium ion cell, capable of improving cell performance in a stable structure during charging/discharging, and a method of preparing the same.

The objects of the present invention are not limited to the above-mentioned objects, and other objects will be clearly understood from the following description by those skilled in the art.

In order to accomplish the above object, there is provided a nanowire for an anode material of a lithium ion cell. The nanowire includes silicon (Si) and germanium (Ge). The nanowire has a content of the silicon (Si) higher than a content of the germanium (Ge) at a surface thereof, and has the content of the germanium (Ge) higher than the content of the silicon (Si) at an inner part thereof.

In addition, there is provided a method of fabricating a nanowire for an anode material of a lithium ion cell. The method includes performing heat treatment with respect to the nanowire including silicon (Si) and germanium (Ge) under a hydrogen atmosphere, and distributing the silicon (Si) and the germanium (Ge) included in the nanowire to a surface of the nanowire and an inner part of the nanowire, respectively.

Furthermore, there is provided a lithium ion cell including an anode including a nanowire for an anode material of a lithium ion cell, the nanowire including silicon (Si) and germanium (Ge), the nanowire having a content of the silicon (Si) higher than a content of the germanium (Ge) at a surface thereof, and having the content of germanium (Ge) higher than the content of the silicon (Si) at an inner part thereof.

As described above, according to the present invention, the nanowire can be prepared through a simple scheme, thereby increasing the yield rate, and can represent excellent structural stability even in the lithiation/delithiation.

In addition, atoms are re-arranged through heat treatment, so that excellent capacity retention and excellent rate capability can be represented. Silicon (Si) is distributed to the surface of the nanowire so that the overpotential can be finely adjusted. Accordingly, the lifespan characteristic can be improved.

BRIEF DESCRIPTION OF THE DRAWINGS

FIG. 1 is a schematic view showing the shape of a nanowire for an anode material of a lithium ion cell before and after heat treatment is performed according to the present invention.

FIG. 2 is a schematic view showing the shape of the nanowire of the anode material of the lithium ion cell according to the present invention.

FIG. 3a is a high-resolution transmission electron microscopy (HRTEM) of the nanowire for the anode material of the lithium ion cell according to the present invention before the heat treatment is performed FIG. 3b is an HRTEM of the nanowire for the anode material of the lithium ion cell after the heat treatment has been performed.

FIG. 3c is a graph showing the atom distribution of the nanowire before the heat treatment is performed.

FIG. 3d is a graph showing the atom distribution of the nanowire after the heat treatment has been performed.

FIG. 4a is a graph showing XRD analysis results of a nanowire and Ge powders before and after the heat treatment is performed.

FIG. 4b is a graph showing an enlarged XRD peak of a plane (111).

FIG. 4c is a graph showing the variation in the XRD peak as a function of a heat treatment temperature.

FIG. 4d is a graph showing an Si mole fraction.

FIG. 5a is a graph showing the variation of a lithium diffusion coefficient according to heat treatment.

FIG. 5b is a graph showing the variation of overpotential according to heat treatment.

FIG. 5c is a graph showing the variation of the lifespan characteristic according to the heat treatment.

FIG. 6a is a TEM showing a SiGe nanowire (subject to the heat treatment temperature at 850° C.) after the first cycle.

FIG. 6b is an enlarged TEM showing the surface of the SiGe nanowire.

FIG. 6c is an enlarged TEM showing a core portion of the SiGe nanowire.

FIG. 6d is a TEM showing a SiGe nanowire, which is not subject to the heat treatment, after the first cycle.

FIG. 6e is an enlarged TEM showing the surface of the SiGe nanowire.

FIG. 6f is an enlarged TEMP showing the core portion of the SiGe nanowire.

FIG. 7a is a graph showing the charging/discharging capacity of the SiGe nanowire (subject to heat treatment temperature at 850° C.) at 0.2 C.

FIG. 7b is a graph showing the lifespan characteristic of the SiGe nanowire (subject to the heat treatment temperature at 850° C.) at 0.2 C.

FIG. 7c is a graph showing the variation of the discharging capacity of the SiGe nanowire (subject to the heat treatment temperature at 850° C.) according to a C-rate.

FIG. 8 is a graph showing the characteristic of the rate capability according to the discharging rate of the nanowire for the anode material of the lithium ion cell according to the present invention.

FIG. 9a is a graph showing the charging/discharging capacity of the lithium ion cell including the nanowire for the anode material of the lithium ion cell according to the present invention at 0.5 C.

FIG. 9b is a graph showing the lifespan characteristic at 0.5 C.

DETAILED DESCRIPTION OF THE INVENTION

Hereinafter, preferred embodiments of the present invention will be described with reference to accompanying drawings.

The advantages, the features, and schemes of achieving the advantages and features of the present invention will be apparently comprehended by those skilled in the art based on the embodiments, which are detailed later in detail, together with accompanying drawings.

However, the present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

In addition, the details of the generally-known technology that makes the subject matter of the present invention unclear will be omitted in the following description.

The present invention provides a nanowire for an anode material of a lithium ion cell. The nanowire includes silicon (Si) and germanium (Ge). The nanowire has the content of Si higher than that of Ge at the surface thereof, and has the content of Ge higher than that of Si at the inner part thereof.

According to the present invention, the nanowire for the anode material of the lithium ion cell can be prepared through a simple scheme, thereby increasing the yield rate, and can represent excellent structural stability even in the lithiation/delithiation. In addition, atoms are re-arranged through heat treatment, so that excellent capacity retention and excellent rate capability can be represented. Si is distributed to the surface of the nanowire so that the overpotential may be finely adjusted. Accordingly, the lifespan characteristic may be improved.

FIG. 1 is a schematic view showing the shape of a nanowire for an anode material of a lithium ion cell after and before heat treatment is performed according to the present invention. As shown in FIG. 1, Si and Ge are selectively provided to the surface of the nanowire and the inner part of the nanowire, respectively, through heat treatment according to the present invention.

In addition, the nanowire for the anode material of the lithium ion cell according to the present invention includes Si having the content of 1 wt % to 10 wt % and Ge having the content 90 wt % to 99 wt %, and may be represented by a chemical composition by $Ge_{(1-x)}Si_x$ (0.01≤x≤0.1).

In addition, the present invention provides a nanowire for an anode material of a lithium ion cell, in which the nanowire including Si and Ge is subject to heat treatment under a hydrogen atmosphere to distribute Si and Ge included in the nanowire to the surface of the nanowire and the inner part of the nanowire, respectively.

In a method of preparing the nanowire for the anode material of the lithium ion cell according to the present invention, the nanowire may be prepared in a vapor-liquid-solid growth (VLS) scheme. In detail, the nanowire may be prepared by using gold nanoparticles as a catalyst after supplying a Ge precursor and a Si precursor into a CVD chamber.

When heat treatment is performed at the temperature of less than 700° C., Si is not moved to the surface of the nanowire, so that the cell performance and the lifespan characteristic may be degraded. When the heat treatment is performed at the temperature of more than 900° C., the nanowire may be damaged.

In this case, preferably, Si has the content of 1 wt % to 10 wt % and Ge has the content of 90 wt % to 99 wt %. When Ge has the content of less than 90 wt %, the cell capacity of the lithium ion cell may be lowered. When Ge has the content of more than 99 wt %, the content of the Si is lowered, so that the nanowire may be damaged in charging/discharging.

In addition, preferably, the hydrogen atmosphere is formed with 1 atm.

The heat treatment is preferably performed for 50 min. to 70 min. When the heat treatment is performed for less than 50 min., Si may not be sufficiently moved to the surface of the nanowire. When the heat treatment is performed for more than 70 min., Si included in the nanowire is entirely moved to the surface of the nanowire. The heat treatment is preferably performed for less than 70 min.

In addition, the present invention provides a lithium ion cell including an anode including the nanowire for the anode material of the lithium ion cell, in which the nanowire includes Si and Ge, and the nanowire has the content of Si higher than that of Ge at the surface thereof, and has the content of Ge higher than that of Si at the inner part thereof.

Embodiment 1: Preparation of Nanowire for Anode Material of Lithium Ion Cell

After forming a 1 nm gold film on a Si substrate by a metallic evaporator, the resultant structure is heated to form gold nanoparticles on the Si substrate. Thereafter, the Si substrate having the formed gold nanoparticles is provided in the CVD chamber, $GeCl_4$ and $SiCl_4$ are fed to the Si substrate, and the resultant structure is heated at 760° C. In this case, amounts of Si and Ge exceed the limits of Si and Ge that can be contained in the gold nanoparticles, so that Si and Ge are precipitated from the nanoparticles to form the nanowire.

The SiGe nanowire is subject to heat treatment at 850° C. for one hour under the hydrogen atmosphere of 1 atm, thereby preparing the nanowire for the anode material of the lithium ion cell.

Following table 1 shows the contents of Si and Ge of the nanowire for the anode material of the lithium ion cell.

TABLE 1

| Atom | wt % | atom % |
|------|------|--------|
| Si | 5.81 | 13.75 |
| Ge | 94.19 | 86.25 |

Experimental Example 1: Analysis of Shape of Nanowire for Anode Material of Lithium Ion Cell And Elements In order to recognize the shape and the elements of the nanowire for the anode material of the lithium ion cell according to the present invention, the nanowire is analyzed by a transmission electron microscopy (TEM) and an auger electron spectroscopy (AES), and the analysis result is shown in FIG. 3.

FIG. 3a is a high-resolution transmission electron microscopy (HRTEM) of the nanowire for the anode material of the lithium ion cell according to the present invention before the heat treatment is performed, and FIG. 3b is an HRTEM of the nanowire for the anode material of the lithium ion cell after the heat treatment has been performed.

As shown in FIGS. 3a and 3b, the nanowire for the anode material of the lithium ion cell according to the present invention has a diameter of 70 nm on average. The nanowire prepared with a clear lattice pattern has high crystallinity without the structural defect. Meanwhile, in the additional Raman spectrum, the Si—Ge vibration mode appearing at 385 $cm^{-1}$ shows that Si is chemically bonded to Ge. Accordingly, it can be recognized that Si is bonded to Ge.

FIG. 3c is a graph showing the atom distribution of the nanowire before the heat treatment is performed, and FIG. 3d is a graph showing the atom distribution of the nanowire after the heat treatment has been performed. While the nanowire is consecutively etched in bulk from the surface thereof by using Ar+, the spatial distribution of Si and Ge are analyzed through an auger electron spectroscopy (AES).

As shown in FIG. 3c, the nanowire alloy of Si and Ge does not show the great variation as the sputtering time is increased, which represents that two elements of Si and Ge uniformly exist through the entire portion of the nanowire before the heat treatment is performed (see FIG. 3c).

In addition, as shown in FIG. 3d, the nanowire still has high crystallinity after the heat treatment has been performed, and the concentration of Si is significantly increased on the surface of the nanowire to the extent of exceeding the concentration of Ge, and gradually reduced toward a core area. As Si is increased on the surface of the nanowire after heat treatment has been performed, Si is exposed to the air to naturally form an oxide layer. Accordingly, it may be recognized that the elements of the surface of the nanowire, which includes $GeO_x$ before the heat treatment is performed, are changed through the heat treatment.

The motivity of the variation in Si distribution resulting from the heat treatment according to the present invention is generally explained as the minimizing of the whole Gibbs free energy. In this regard, Ge exists on the surface of the nanowire because it is advantageous in terms of energy that Si exists at the inner part of the nanowire rather than the surface of the nanowire as the surficial energy of Ge is lowered than that of Si. This distribution represents an opposite result as recognized from the nanowire according to the present invention. According to the present invention, because heat treatment is performed under the existence of hydrogen, a larger amount of Si may be re-arranged in the vicinity of the surface of the nanonwire.

Experimental Example 2: Arrangement of Atoms of Nanowire for Anode Material of Lithium Ion Cell and Analysis of Content of Si as Function of Heat Treatment Temperature In order to recognize the arrangement of atoms of the nanowire for the anode material of the lithium ion cell according to the present invention and the content of Si as a function of a temperature, analyzed by using XRD and the XRD analysis result is shown in FIG. 4a.

FIG. 4a is a graph showing XRD analysis results of a nanowire and Ge powders before and after the heat treatment is performed, FIG. 4b is a graph showing an enlarged XRD peak of a plane (111), FIG. 4c is a graph showing the variation in the XRD peak as a function of a heat treatment temperature, and FIG. 4d is a graph showing an Si mole fraction.

As shown in FIG. 4a, the nanowire according to the present invention has the diffraction patterns before and after the heat treatment which are substantially identical to the diffraction pattern of Ge powders since Ge has the high content in the nanowire. In this case, the XRD peak shown only in Ge powders results from the presence of $GeO_2$.

Regarding the detailed diffraction pattern, as shown in FIG. 4b, the diffraction patterns before and after the heat treatment are shown at a 2θ value higher than that of Ge powders. Such a difference means that the lattice constant of Ge powders is smaller than the lattice constant of the nanowire. This is because Si, which has the lattice constant lower than that of Ge, is bonded in the Ge crystal lattice. Representatively, the XRD peak of the (111) crystal plane is represented as 27.47° in the case of SiGe nanowire before the heat treatment is performed, and the lattice constant corresponding to 27.47° is 5.6120 Å. Accordingly, the chemical composition calculated based on the lattice constant is $Ge_{0.85}Si_{0.15}$, which is identical to the EDX result of 14 atom % of Si. In addition, the diffraction peak of the (111) crystal plane after the heat treatment has been performed is moved from 27.47° to 27.35°, which means that lattice constant of the SiGe nanowire is increased to 5.6425 Å, and the chemical composition is changed to $Ge_{0.94}Si_{0.06}$.

Since Si has the vapor pressure of about zero under the heat treatment condition according to the present invention, the evaporability of Si may be negligible. Accordingly, the movement of the diffraction peak is caused by the exchange reaction between Si and Ge. According to the exchange reaction between Si and Ge, a portion of Si atoms moves closely to the surface of a crystal lattice from the inner part of the crystal lattice, and another portion of the Si atoms is further moved onto the surface of the crystal lattice, thereby forming amorphous Si or $SiO_x$ due to the exposure to the air.

In addition, as shown in FIG. 4c, as the temperature is increased from 600° C. to 900° C. through the heat treatment for one hour, the diffraction peak of the (111) crystal plane is gradually moved to a lower 2-θ value.

As shown in FIG. 4d, the relative ratio of Si to Ge for the crystallinity of the nanowire is not changed at the heat treatment temperature of 600° C. or less, which means that thermal energy is too insufficient to induce the re-arrangement of atoms. Meanwhile, the ratio of Si is started to be reduced at the heat treatment temperature of is 650° C., and reaches to the minimum value of 6 atoms % of Si at the temperature of 850° C. When the heat treatment temperature exceeds 850° C., the shape of an SiGe nanowire may be seriously damaged.

Experimental Example 3: Analysis of Variation in Lithium Diffusion Coefficient and Overpotential According to Heat Treatment Temperature and Variation in Lifespan Characteristic in Nanowire for Anode Material of Lithium Ion Cell In order to analyze the lithium diffusion coefficient, overpotential, and the lifespan characteristic according to heat treatment temperature in the nanowire for the anode material of the lithium ion cell according to the present invention, a SiGe nanowire (subject to heat treatment at 700° C.), a SiGe nanowire (subject to heat treatment at 850° C.), and a SiGe nano-wire, which is not subject to the heat treatment, having mutually different Si segregation degrees are used as an anode for a half-lithium ion cell and analyzed, and the analysis result is shown in from FIG. 5a to FIG. 5c. In this case, the charging/discharging of 0.1 C (120 mA/g at 24° C.) is performed in a voltage window from 0.005 V to 1.5 V.

FIG. 5a is a graph showing the variation of a lithium diffusion coefficient according to heat treatment, FIG. 5b is a graph showing the variation of overpotential according to heat treatment, and FIG. 5c is a graph showing the variation of the lifespan characteristic according to the heat treatment.

As shown in FIG. 5a, as the ratio of Si having a lower lithium diffusion coefficient is increased on the surface (Type-U SiGe NW<Type-G SiGe NW, 700° C.<Type-G SiGe NW, 850° C., the measured lithium diffusion coefficient is reduced.

In addition, as shown in FIG. 5b, the overpotential corresponding to each sample is gradually increased due to the mass transfer resistivity increased due to the slow lithium diffusion of Si. The variation in the overpotential according to the Si segregation degree is considered to exert an influence on the electrical-chemical property during the charging/discharging, and the structural stability of the anode can be significantly improved during the charging/discharging cycle.

In addition, as shown in FIG. 5c, the lifespan characteristic is estimated under the condition of the charging/discharging rate of 1 C. According to the estimation result, in order to form a solid electrolyte interface (SEI), half-cells are significantly slowly charged/discharged at 0.05 C in the voltage window of 0.005 V to 1.5 V during the first cycle. During the initial cycle, the capacity is gradually decreased as the overpotential is increased since greater energy is required to induce the lithiation reaction as the overpotential is increased. When taking into consideration the trade-off between the improved lifespan characteristic and the reduced capacity, the SiGe nanowire (subject to heat treatment at 850° C.) representing the capacity retention of 90.0% and 1031 mAh/g or more is most excellent in the overall performance after 300 cycles, the SiGe nanowire (subject to heat treatment at 700° C.), which represents a high initial capacity of 60 mAh/g in the half-cell, represents the lowest lifespan characteristic after 300 cycles, and the capacity of the SiGe nanowire before the heat treatment is rapidly lowered after 115 cycles, and lowered to 10 mAh/g after 175 cycles.

In addition, the SiGe nanowire (subject to heat treatment at 850° C.) is maintained in the inherent one-dimensional structure even after 200 cycles while the SiGe nanowire (subject to heat treatment at 700° C.) is not maintained in the inherent one-dimensional structure after 200 cycles.

Experimental Example 4: Analysis of Shape of Nanowire for Anode Material of Lithium Ion Cell After Charging/Discharging The shape of the nanowire for the anode material of the lithium ion cell according to the present invention after charging/discharging is analyzed by a high-resolution transmission electron microscopy (HRTEM), and the analysis result is shown in from FIG. 6a to FIG. 6f.

FIG. 6a is a TEM showing the SiGe nanowire (subject to the heat treatment at 850° C.) after the first cycle, FIG. 6b is an enlarged TEM showing the surface of the SiGe nanowire, FIG. 6c is an enlarged TEM showing a core portion of the SiGe nanowire, FIG. 6d is a TEM showing a SiGe nanowire, which is not subject to the heat treatment, after the first cycle, FIG. 6e is an enlarged TEM showing the surface of the SiGe nanowire, and FIG. 6f is an enlarged TEMP showing the core portion of the SiGe nanowire.

As shown in FIG. 6a, the existence of the unlithiated part is recognized through the HRTEM after the first cycle.

In addition, as shown in FIGS. 6b and 6c, the surface part of the SiGe nanowire (subject to heat treatment at 850° C.) is changed to an amorphous state as the nanowire is lithiated to be subject to a solid-phase amorphization electro-chemically induced while the core part of the SiGe nanowire is maintained in a crystal structure. In other words, if the nanowire is subject to the lithiation, a crystal material is changed to an amorphous material. However, if the nanowire exists as a crystal material even after the first cycle, the nanowire may not be lithiated.

By contrast, referring to FIGS. 6d, 6e, and 6f, both of the surface part and the core part are changed to the amorphous state after the first cycle. It should not be noted that the lithiated crystal part of the SiGe nanowire (subject to the heat treatment at 850° C.) after 200 cycles is not observed by the HRTEM. However, the unlithiated part still remains to play an important role as a buffer layer when the stable lifespan characteristic during 300 cycles and a non-reaction capacity in comparison with the SiGe nanowire, which is not subject to the heat treatment, are taken into consideration.

Experimental Example 5: Analysis of Lifespan Characteristic and Rate Capability Characteristic of Nanowire for Anode Material of Lithium Ion Cell The lifespan characteristic and the rate capability characteristic of the nanowire for the anode material of the lithium ion cell according to the present invention are analyzed, and the analysis result is shown in FIGS. 7 and 8.

FIG. 7a is a graph showing the charging/discharging capacity of the SiGe nanowire (subject to heat treatment temperature at 850° C.) at 0.2 C. FIG. 7b is a graph showing the lifespan characteristic of the SiGe nanowire (subject to the heat treatment temperature at 850° C.) at 0.2 C. FIG. 7c is a graph showing the variation of the discharging capacity of the SiGe nanowire (subject to the heat treatment temperature at 850° C.) according to a C-rate.

It is necessary to observe whether or not the structural stability of an electrode is maintained at various C-rates for a long cycle when taking into consideration that rapid lithiation/delithiation induces the significant mechanical stress to the electrode as the C-rate (charging/discharging rate) is increased. Accordingly, the lifespan characteristics of the SiGe nanowire (subject to the heat treatment at 850° C.) at C-rates ranging from 0.2 C to 10 C are observed.

As shown in FIG. 7a, the initial charging capacity and the initial discharging capacity are 2,140 mAh/g and 1,506 mAh/g, respectively at the first cycle in the case of 0.2 C, and the coulomb efficiency (charging capacity/discharging capacity) is measured to 70.5%. The irreversible capacity loss during the first cycle is considered caused due to the formation of the SEI or the decomposition of the oxide layer resulting from the side reaction between the electrolyte and the electrode active material.

Furthermore, as shown in FIG. 7b, in the SiGe nanowire (subject to heat treatment at 850° C.) according to the present invention, coulomb efficiency is increased to 98.8% on average within 400 cycles. After 400 cycles, the high capacity retention of 89.0% is shown and the excellent lifespan characteristic is represented at 0.2 C.

In addition, as shown in FIG. 7c, even when the C-rate ranges from 0.2 C to 10 C, the structural stability of the electrode is maintained, and the stable capacity retention is shown even after the long charging/discharging cycle. In the case of 0.2 C, 1 C, 4 C, or 10 C, the reversible capacity of 1266 mAh/g, 1145 mAh/g, 1000 mAh/g, or 515 mAh/g is shown. In the case of 0.2 C, 1 C, or 4 C, the capacity retention of 91.9%, 90.0%, or 84.6% is shown after 300 cycles. In the case of 10 C, the capacity retention of 82.4% is shown after 200 cycles.

In addition, although the SiGe nanowire (subject to the heat treatment at 850° C.) may represent slight capacity loss due to the increased overpotential, the SiGe nanowire (subject to the heat treatment at 850° C.) represents the high rate capability characteristic still higher than that of the SiGe nanowire. The SiGe nanowire (subject to the heat treatment at 850° C.) according to the present invention represents 579 mAh/g higher than the theoretical capacity (372 mAh/g) of a graphite anode commercialized at 10 C (12 A/g) due to the higher mole fraction of Ge corresponding to 95 wt %. The mole fraction of Ge having the higher lithium diffusion coefficient and the higher electrical conductivity accelerates the swift movement of Li to ensure the higher rate capability characteristic. In order to evaluate the discharging characteristic at the higher charging/discharging rate, an experiment is made by fixing the charging rate of the half-cell including the SiGe nanowire (subject to the heat treatment at 850° C.) to 0.2 C, and varying the discharging rate from 0.2 C to 100 C.

FIG. 8 is a graph showing the rate capability resulting from the discharging rate of the nanowire for the anode material of the lithium ion cell according to the present invention.

As shown in FIG. 8, the SiGe nanowire (subject to the heat treatment at 850° C.) represents the high capacity of 304.5 mAh/g at 60 C and the excellent rate capability characteristic.

Experimental Example 6: Analysis of Lifespan Characteristic of Lithium Ion Cell Including Nanowire for Anode Material of Lithium Ion Cell The lifespan characteristic of the lithium ion cell including the nanowire for the anode material of the lithium ion cell according to the present invention is analyzed and the analysis result is shown in from FIG. 9a. to FIG. 9b.

In order to analyze the lifespan characteristic of the nanowire for the anode material of the lithium ion cell according to the present invention, a $Li_2MnO_3$ cathode and a full-cell are prepared and tested, and the analysis is made in the voltage window of 4.3 V to 2.3 V at the temperature of 24° C.

FIG. 9a is a graph showing the charging/discharging capacity of the lithium ion cell including the nanowire for the anode material of the lithium ion cell according to the present invention at 0.5 C, and FIG. 9b is a graph showing the lifespan characteristic at 0.5 C.

As shown in FIGS. 9a and 9b, the full-cell represents the maximum capacity of 87.3 mAh/g based on a $Li_2MnO_3$ reference capacity, the capacity retention of 84.2% at the charging rate of 0.5 C, the discharging rate of 1 C after 800 cycles, and the stable lifespan characteristic.

What is claimed is:

1. A method of fabricating a nanowire for an anode material of a lithium ion cell, the method comprising:
   forming gold nanoparticles on a Si substrate;
   providing the Si substrate in a CVD chamber;
   feeding $GeCl_4$ and $SiCl_4$ to the Si substrate in the CVD chamber;
   heating a resultant structure to form a nanowire including silicon (Si) and germanium (Ge);
   performing heat treatment with respect to the nanowire including the silicon (Si) and the germanium (Ge) under a hydrogen atmosphere; and
   distributing the silicon (Si) included in the nanowire to a surface part of the nanowire and the germanium (Ge) included in the nanowire to a core part of the nanowire, respectively,
   wherein the silicon (Si) in the surface part of the nanowire is in amorphous state after a first cycle of a lithiation, and the germanium (Ge) in the core part of the nanowire is in crystalline state after the first cycle of a lithiation.

2. The method of claim 1, wherein the silicon (Si) has a content in a range of 1 wt % to 10 wt %, and the germanium (Ge) has a content in a range of 90 wt % to 99 wt %.

3. The method of claim 1, wherein the heat treatment is performed at a temperature in a range of 700° C. to 900° C.

* * * * *